(12) United States Patent
Hardy et al.

(10) Patent No.: US 8,539,361 B2
(45) Date of Patent: Sep. 17, 2013

(54) MULTIPLE DISPLAY REGIONS IN A UNIFIED MESSAGE INBOX

(75) Inventors: Michael Thomas Hardy, Waterloo (CA); Darrell May, Waterloo (CA)

(73) Assignee: Blackberry Limited, Waterloo (CA)

( * ) Notice: Subject to any disclaimer, the term of this patent is extended or adjusted under 35 U.S.C. 154(b) by 801 days.

(21) Appl. No.: 12/168,570

(22) Filed: Jul. 7, 2008

(65) Prior Publication Data
US 2009/0144655 A1  Jun. 4, 2009

Related U.S. Application Data

(60) Provisional application No. 60/991,894, filed on Dec. 3, 2007.

(51) Int. Cl.
*G06F 3/00* (2006.01)
*G06F 15/16* (2006.01)

(52) U.S. Cl.
USPC .......................... 715/752; 709/206

(58) Field of Classification Search
USPC .................................. 715/752, 803
See application file for complete search history.

(56) References Cited

U.S. PATENT DOCUMENTS

| | | | |
|---|---|---|---|
| 6,243,725 B1 * | 6/2001 | Hempleman et al. | 715/210 |
| 6,628,194 B1 | 9/2003 | Hellebust et al. | |
| 6,832,355 B1 * | 12/2004 | Duperrouzel et al. | 715/788 |
| 7,237,191 B1 * | 6/2007 | Sulistio et al. | 715/246 |
| 7,359,947 B2 * | 4/2008 | Kelley et al. | 709/206 |
| 7,392,249 B1 | 6/2008 | Harris et al. | |
| 7,472,357 B1 * | 12/2008 | Satterfield et al. | 715/859 |
| 7,788,589 B2 * | 8/2010 | Frankel et al. | 715/752 |
| 2002/0023135 A1 | 2/2002 | Shuster et al. | |
| 2003/0013483 A1 | 1/2003 | Ausems et al. | |
| 2003/0126136 A1 | 7/2003 | Omoigui | |
| 2003/0195937 A1 | 10/2003 | Kircher et al. | |
| 2003/0229673 A1 | 12/2003 | Malik | |
| 2004/0068695 A1 * | 4/2004 | Daniell et al. | 715/513 |
| 2004/0162879 A1 * | 8/2004 | Arcuri et al. | 709/206 |
| 2004/0177048 A1 * | 9/2004 | Klug | 705/401 |

(Continued)

FOREIGN PATENT DOCUMENTS

| | | |
|---|---|---|
| EP | 1484703 A1 | 12/2004 |
| EP | 1569427 A | 8/2005 |

(Continued)

OTHER PUBLICATIONS

Pages from website: http://www.redflagdeals.com/forums/forumdisplay.php?f=9, accessed Dec. 18, 2006.

(Continued)

*Primary Examiner* — Stephen Alvesteffer
(74) *Attorney, Agent, or Firm* — Jenna L. Wilson; Dimock Stratton LLP

(57) ABSTRACT

Various embodiments are provided herein of a method of displaying an inbox window of a message application. The method includes partitioning a display of the inbox window into a first message display region and a second message display region, displaying located messages that satisfy user-defined designation criteria in the first message display region; and displaying remaining messages of the inbox window in the second message display region. The method can be performed by a communications device and can also be stored as program code on a computer readable medium.

21 Claims, 11 Drawing Sheets

(56) References Cited

U.S. PATENT DOCUMENTS

| | | | |
|---|---|---|---|
| 2004/0189707 A1* | 9/2004 | Moore et al. | 345/777 |
| 2004/0239684 A1 | 12/2004 | McGuire et al. | |
| 2005/0004989 A1* | 1/2005 | Satterfield et al. | 709/206 |
| 2005/0015451 A1 | 1/2005 | Sheldon et al. | |
| 2005/0039136 A1 | 2/2005 | Othmer | |
| 2005/0108338 A1 | 5/2005 | Simske et al. | |
| 2005/0114753 A1* | 5/2005 | Kumar et al. | 715/500.1 |
| 2005/0138552 A1 | 6/2005 | Venolia et al. | |
| 2005/0165895 A1* | 7/2005 | Rajan et al. | 709/206 |
| 2005/0204009 A1 | 9/2005 | Hazarika et al. | |
| 2005/0246640 A1* | 11/2005 | Lacy | 715/713 |
| 2006/0010217 A1 | 1/2006 | Sood | |
| 2006/0083358 A1 | 4/2006 | Fong et al. | |
| 2006/0173961 A1* | 8/2006 | Turski et al. | 709/206 |
| 2006/0200530 A1 | 9/2006 | Tokuda et al. | |
| 2007/0038610 A1 | 2/2007 | Omoigui | |
| 2007/0061307 A1* | 3/2007 | Hartwell et al. | 707/3 |
| 2007/0162582 A1 | 7/2007 | Belali et al. | |
| 2007/0179945 A1 | 8/2007 | Marston et al. | |
| 2007/0288932 A1 | 12/2007 | Horvitz et al. | |
| 2008/0046830 A1* | 2/2008 | Pasquale et al. | 715/764 |
| 2008/0086640 A1 | 4/2008 | Voss et al. | |
| 2008/0126951 A1 | 5/2008 | Sood et al. | |
| 2008/0235335 A1 | 9/2008 | Hintermeister et al. | |
| 2010/0198927 A1* | 8/2010 | Tonnison et al. | 709/206 |

FOREIGN PATENT DOCUMENTS

| | | | |
|---|---|---|---|
| EP | 1667388 A | | 6/2006 |
| EP | 1718015 A1 | | 11/2006 |
| WO | 02103967 A | | 12/2002 |
| WO | 03058464 A1 | | 7/2003 |
| WO | 2005115035 A | | 12/2005 |
| WO | 2007040648 A1 | | 4/2007 |

OTHER PUBLICATIONS

Co-pending U.S. Appl. No. 11/739,370, "System and Method for Prioritizing and Displaying Messages", filed Apr. 24, 2007.
"Saved Search", MozillaZine Knowledge Base, http://kb.mozillazine.org/Saved_Search, accessed Dec. 12, 2006.
Lewis, M., "Designing for Human-Agent Interaction", Apr. 16, 2003, URL: http://usl.sis.pitt.edu/ulab/pubs/aaaipap.pdf.
Supplementary Search Report dated Dec. 2, 2010 from EP08783189.
International Search Report dated Nov. 6, 2008, International Patent Application No. PCT/CA2008/001263.
Dyson, E. (2004) 'Meta-mail: A Medium for Meaning', Release 1.0 Report, vol. 22, No. 6, Jun. 31, 2004, p. 9.
Venolia et al. (2001) 'Supporting Email Workflow', Microsoft Research Technical Report MSR-TR-2001-88, revised Dec. 2001.
Roecker et al. (2005) "Context-Dependnet Email Notification Using Ambient Displays and Mobile Devices" in H. Tarumi, Y. Li, T. Yoshida (Eds.): Proceedings of the International IEEE Conference on Active Media Technology (AMT'05), May 19-21, Takamatsu, Kagawa, Japan, pp. 137-138.
Skinner, J.M., "Multi-Agent Systems and Mixed-Initiative Intelligence", LEF Grant report, published at least as early as May 29, 2007, www.csc.com/aboutus/lef/mds67_off/uploads/skinner_mixed_initiative_agents.pdf.
Examination Report dated Oct. 25, 2011 from EP08783189.7.

* cited by examiner

MULTIPLE DISPLAY REGIONS IN A UNIFIED MESSAGE INBOX

REFERENCE TO RELATED APPLICATION

This application claims the benefit of U.S. Provisional Application No. 60/991,894 filed on Dec. 3, 2007.

FIELD

The embodiments described herein generally relate to an electronic device with a message application that provides a user with at least two message display regions with which to view messages of an inbox.

BACKGROUND

Many communication devices that are currently used today allow the user to send and receive messages. Examples of messages include electronic mail (e-mail), Short Message Service (SMS) messages, Instant Messages (IM) messages, Multimedia Messaging Services (MMS) messages, a calendar event and the like. Examples of communication devices that can send and receive at least some of these messages include personal computers, personal digital assistants, cellular phones with messaging capabilities and the like. These communication devices are typically provided with a message application that can be used to manage these messages, including allowing the user to store and display the received messages. The message application uses a single display region, referred to as an "inbox window" that is used to display the received messages that the user has not yet deleted or stored in another folder. The messages in the inbox window are shown in an ordered list based on a certain attribute of the message.

If the number of messages in the inbox is larger than the number of messages that the corresponding display region can accommodate, then only a certain number of messages are shown from the beginning of this ordered list. To view the remaining messages, the message application typically provides the display region with a scroll bar or some other means to allow the user to view the remaining messages. Furthermore, as new messages are received, the messages at the bottom of the display region move out of the display region since the messages are usually listed based on the date that the messages are received with the most recently received messages being listed first.

Typically, the user will receive a message that the user needs to act on at some future time. For instance, the user may receive a message regarding an upcoming teleconference. Alternatively, the user may receive a message regarding an errand that must be performed. Since the user wishes to remember these items, the user typically keeps these messages in the inbox instead of storing or deleting the messages so that it is in plain view whenever the user looks at the inbox. However, since the user typically receives many other messages that are in the inbox, these messages of interest that the user wishes to remember may be "pushed out" of the display region and will no longer be in plain sight. The user may then forget about these messages of interest, or have to waste time scrolling through the various messages in the inbox in order to find these messages of interest.

BRIEF DESCRIPTION OF THE DRAWINGS

For a better understanding of the following embodiments described herein, and to show more clearly how the various embodiments described herein may be carried into effect, reference will be made, by way of example, to the accompanying drawings which show at least one example embodiment, and in which.

DETAILED DESCRIPTION OF THE EMBODIMENTS

Figure 1:
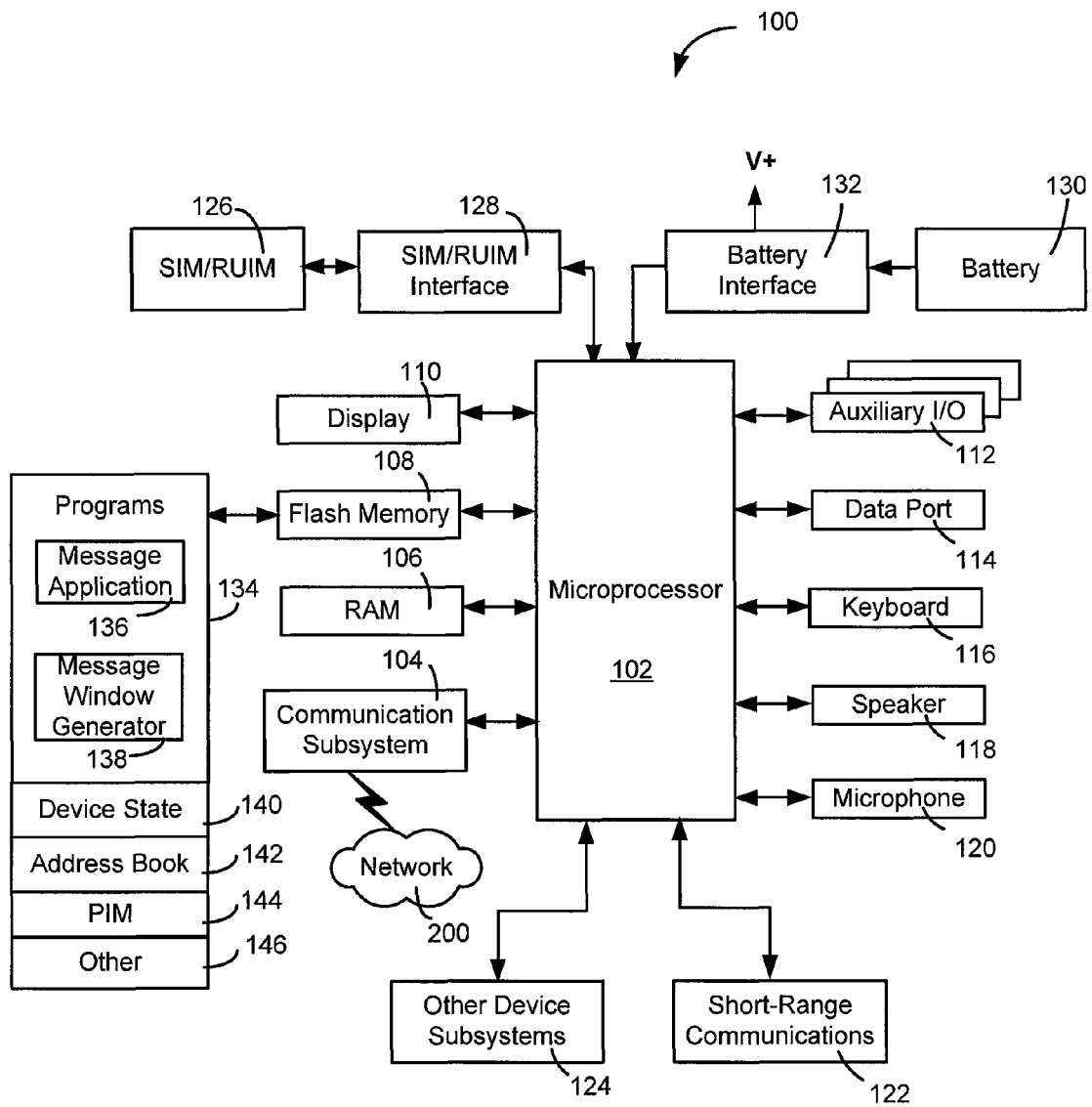
FIG. 1 is a block diagram of a mobile device in one example implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. The detailed description begins with a general description of a mobile environment and then proceeds to describe the application of example embodiments within this environment.

The embodiments described herein generally have applicability in the field of data communication for communication devices that can send messages to two or more recipients. To facilitate an understanding of the embodiments, the embodiments will generally be described in terms of e-mail communication on a mobile wireless communications device that can receive messages, hereafter referred to as a mobile device. The mobile device communicates with other devices through a network of transceiver stations. To aid the reader in understanding the structure of the mobile device and how it communicates with other devices and host systems, reference will be made to FIGS. 1 through 4. However, it should be understood that the embodiments are not limited to e-mail messages or mobile communication devices. Examples of applicable communication devices generally include data messaging devices such as some cellular phones, cellular smart-phones, some pagers, wireless organizers, personal digital assistants, computers, laptops, handheld wireless communication devices, wirelessly enabled notebook computers, a wireless Internet appliance and the like, each of which is capable of receiving messages.

Referring first to FIG. 1, shown therein is a block diagram of a mobile device 100 in one example implementation. The mobile device 100 comprises a number of components, the controlling component being a microprocessor 102, which controls the overall operation of mobile device 100. Communication functions, including data and voice communications, are performed through a communication subsystem 104. The communication subsystem 104 receives messages from and sends messages to a wireless network 200. In this example implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the microprocessor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, SMS, and MMS. More advanced services may include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136 and a message display region generator 138. The message application 136 can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the device 100 such as in a data store of an associated host system that the mobile device 100 communicates with. For instance, in some cases, only recent messages may be stored within the device 100 while the older messages may be stored in a remote location such as the data store associated with a message server. This may occur when the internal memory of the device 100 is full or when messages have reached a certain "age", i.e. messages older than 3 months may be stored at a remote location. In an alternative implementation, all messages can be stored in a remote location while only recent messages can be stored on the mobile device 100.

The message display region generator module 138 controls how messages are displayed in an inbox window having multiple display regions. This can be done according to various embodiments, which are described in conjunction with FIGS. 5-11. The message display region generator 138 partitions the display region associated with the inbox window into at least two multiple message display regions. The message display region generator 138 then reviews the messages that are to be displayed in the inbox window to determine which display message region the messages should be displayed in based on the user's actions. The operation of the message display region generator 138 is discussed in further detail below. The message display region generator 138 can be created using any suitable software programming language as is well known to those skilled in the art.

The mobile device 100 further includes a device state module 140, an address book 142, a Personal Information Manager (PIM) 144, and other modules 146. The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book, the information can include the name, phone number, work address and email address of the contact, among other information. The other modules 146 may include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication. The data port 114 may be any suitable port that enables data communication between the mobile device 100 and another computing device. The data port 114 may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, may also be implemented on the mobile device 100. Although voice or audio signal output is accomplished primarily through the speaker 118, the display 110 may also be used to provide additional information such as the identity of a calling party, duration of a voice call, or other voice call related information.

Figure 2:
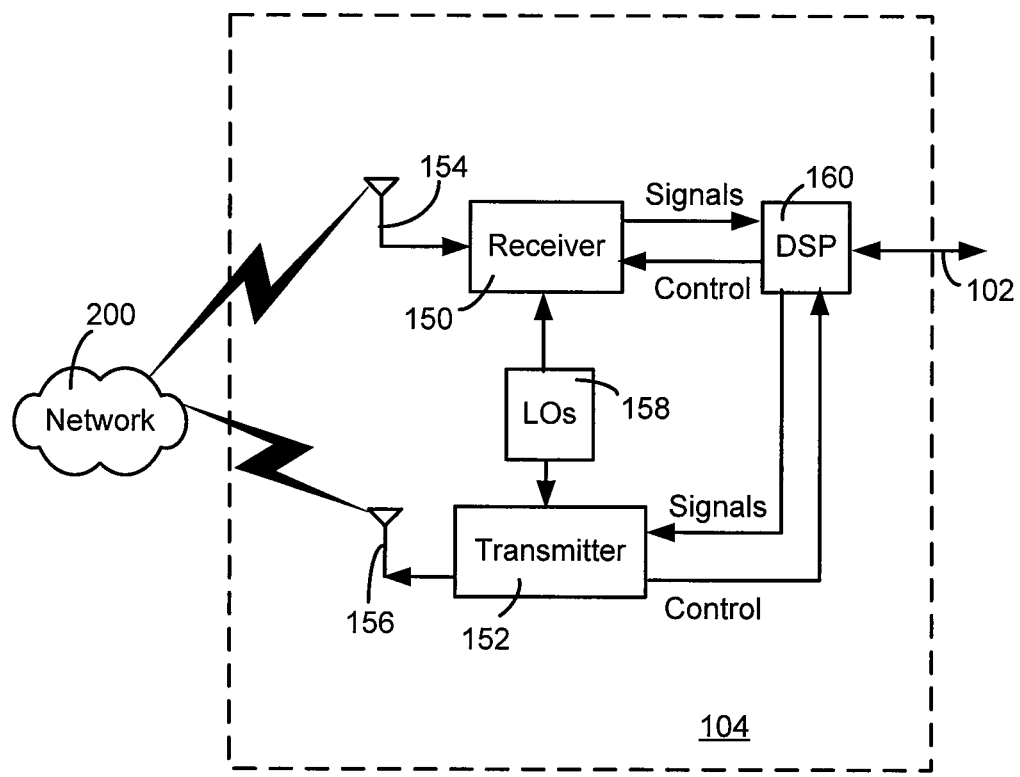
FIG. 2 is a block diagram of an example embodiment of a communication subsystem component of the mobile device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 may be adaptively controlled through automatic gain control algorithms implemented in the DSP 160.

The wireless link between the mobile device 100 and the wireless network 200 may contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
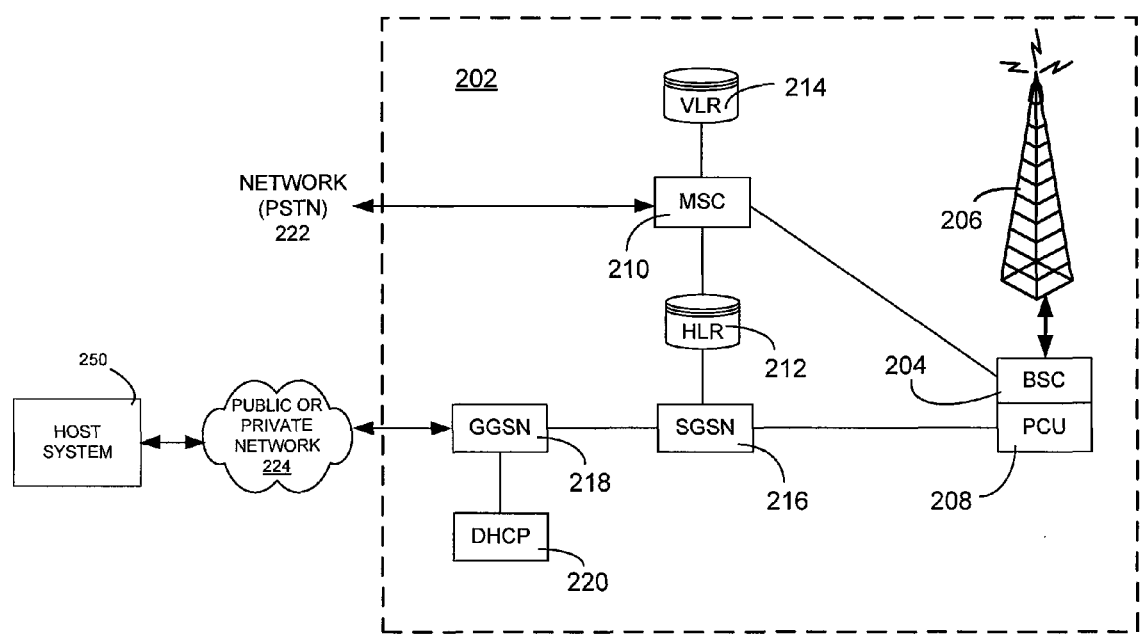
FIG. 3 is a block diagram of a node of a wireless network in one example implementation.

Referring now to FIG. 3, a block diagram of an example implementation of a node of the wireless network 200 is shown as 202. In practice, the wireless network 200 comprises one or more nodes 202. The mobile device 100 communicates with the node 202. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit-switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
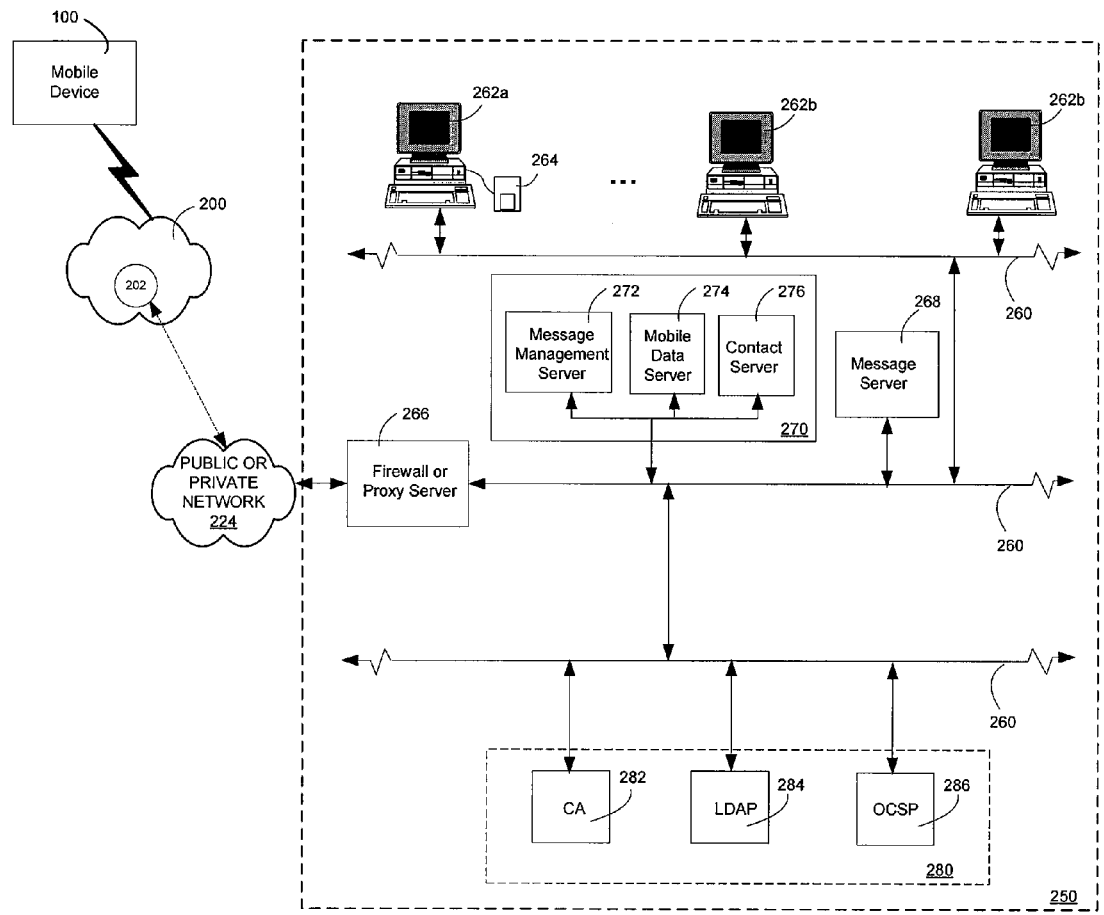
FIG. 4 is a block diagram illustrating components of a host system in one example implementation.

Referring now to FIG. 4, shown therein is a block diagram illustrating components of an example configuration of a host system 250. In one instance, the host system 250 may be a corporate enterprise. The host system 250 will typically be a corporate office or other local area network (LAN), but may also be a home office computer system or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202.

The host system 250 comprises a number of network components connected to each other by the LAN connections 260. For instance, a user's desktop computer 262a with an accompanying cradle 264 for the user's mobile device 100 is situated on a LAN connection. The cradle 264 for the mobile device 100 may be coupled to the computer 262a by a serial or a Universal Serial Bus (USB) connection, for example. Other user computers 262b are also situated on the LAN 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a, 262b will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example embodiment of FIG. 4.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless Internet gateway for the host system 250. The proxy server 266 intelligently routes data to the correct destination server.

In a variant implementation, the host system 250 includes a wireless VPN router (not shown) to facilitate data exchange between the host system 250 and the mobile device 100. The wireless VPN router enables a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or to a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In an alternative embodiment, the data store may be a separate hardware unit (not shown) that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the handheld. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

To facilitate the wireless communication of messages and message-related data between the mobile device 100 and components of the host system 250, a number of wireless communication support components 270 may be provided. In this example implementation, the wireless communication support components 270 can include a message management server 272, a mobile data server 274 and a contact server 276, for example.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, when a message is initially retrieved by the mobile device 100 from the message server 268, there can be times when the message management server 272 pushes only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size.

Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion to the address book 142 on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274 and the contact server 276 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported.

Having described the general mobile environment, the following description focuses on the message application 136 that displays the messages in an inbox window in at least two message display regions via the message display region generator 138. The message display region generator 138 provides user input options to allow the user to control the messages that are shown in each message display region. The message display region generator 138 also provides the user with the ability to constantly display certain messages of interest, or important messages, in one of the message display regions while being able to scroll through messages in another message display region. Accordingly, if the user receives a message that the user needs to act on at some future time, such as a message regarding an errand that must be performed, the message display region generator 138 can provide the user with the ability to set this message as an important message and constantly display the important message in one of the message display regions, while displaying the remaining inbox messages in an additional message display region even as the user is scrolling through the messages in the additional message display region so that the important message is in plain view whenever the user looks at the inbox window. The user can control the display of messages in the multiple message display regions in at least one of a manual or automatic fashion. The user can also include additional message display regions and control how messages are displayed in those additional message display regions as is described in more detail below.

Figure 5:
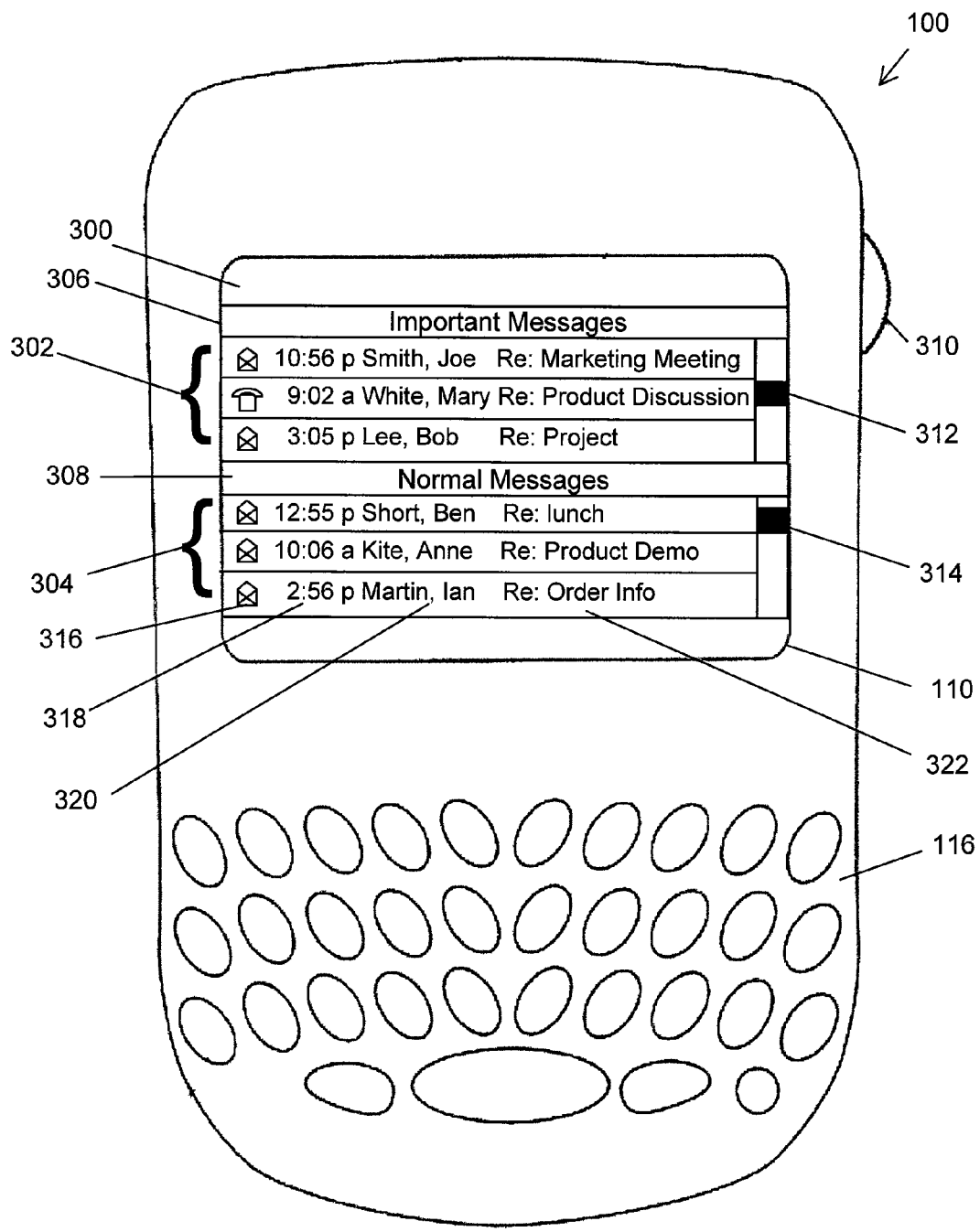
FIG. 5 is an illustration of an example embodiment of an inbox that can be displayed by the mobile device having multiple message display regions.

Referring now to FIG. 5, shown therein is an illustration of an example embodiment of an inbox window 300 for the mobile device 100. The inbox window 300 is shown in the display 110 of the mobile device 100 and has multiple message display regions including a first message display region 302 and a second message display region 304. In this example, the first message display region 302 includes a header 306 labelled "Important Messages", but other headers can be used such as "Messages of Interest", and the second message display region 304 includes a header 308 labelled "Normal Messages", however other labels can be used.

The messages that are displayed in the first message display region 302 are shown in that display region because they have been selected or designated by the user as being an important message. The user can designate a message as an important message in various ways. For instance, the user can highlight the message of interest by moving a cursor on the message via the thumbwheel 310 and pressing a designated key from the keyboard 116 typically referred to as a hot key. Alternatively, the user can highlight the message of interest and depress the thumbwheel 310 to access a menu (not shown) that provides several options for processing the message, such as reply, delete, store, and the like as is commonly known by those skilled in the art. In this case one of those options is to identify the message of interest as an important message, at which point it will then be displayed in the first message display region 302 in an ordered list based on some attribute such as the date that the message was received. These techniques for designating a message as an important message are examples of manual techniques. Alternatively, the user can also use automatic techniques, some of which are described below with respect to FIGS. 7-8.

In this particular example, the message display regions 302 and 304 are both provided with scrollbars 312 and 314, which appear when the number of messages in these message display regions 302 and 304 are too large to fit in the physical space that has been allocated to the message display regions 302 and 304. In at least some implementations, the user can set the size of each display region 302 and 304 via a menu option screen (not shown) associated with the message display regions. The menu option screen can also allow the user to configure other settings such as dynamically allocating the size of each message display region 302 and 304 based on the number of current messages to display. For instance, if there is only one important message, then the size of the message display region 302 needs only to be large enough to show the one important message and more room can be allocated to the message display region 304. The message display region 304 can be configured in a similar fashion. In this example, the size of each message display region 302 and 304 can be adjusted, depending on the number of messages to be shown in each region up to a maximum size, after which if there are additional messages to be displayed the scrollbars 312 and 314 are displayed, as required, to allow the user to review the additional messages. The user can also configure the message display regions 302 and 304 such that the first message display region 302 takes up more space than the message display region 304. This allows the user to work with the important messages in the message display region 302 while still being able to see new messages that are received and displayed in the message display region 304.

The important messages in the first message display region 302 are constantly displayed even when the user is scrolling through messages in the second message display region 304. The important messages in the first message display region 302 are also displayed as newer messages are being received by the mobile device 100. In this example, the newer messages are placed in the second message display region 304 unless there are rules that are automatically applied to designate an incoming message as an important message (this is discussed in an alternative embodiment below). Accordingly, the important messages are always in plain view of the user so that the user is reminded of the actions that must be taken for each of the important messages. The user can also scroll through the important messages if there are too many important messages to display in the message display region 302. Also, allowing the user to select which messages are designated as an important message provides the user with increased flexibility, rather than having to rely on the sender of the message for designating a message as a high priority message, in which case the user would still have to search through the inbox window for the messages that are designated in this fashion.

In this example, each message includes a status icon 316, a time field 318, a sent address field 320 and a subject field 322. The status icon 316 indicates what type of message is being shown, and whether this message has been reviewed by the user. For example, an envelope can be used to show that the message is an e-mail and an open envelope can be used to show that the message has been reviewed. However, the status can be shown in other ways such as using bold-font text in each field of an unread message or by using different background colors to discriminate read messages from unread messages. The time field 318 indicates the time that the message was received by the mobile device 100 and the sent address field 320 indicates the person who sent the message to the user. The subject field 322 shows the subject of the message. In alternative embodiments, other fields can be shown. Alternatively, in other embodiments, some of the aforementioned fields may not be shown since certain fields can be configurable. In at least some cases, the user can use the menu option screen (not shown) to control how messages are displayed in each of the message display regions 302 and 304 and optionally which fields are shown. For example, in at least some embodiments, the number of lines used to display a message is configurable.

Various types of messages having different formats can be shown in the message display regions 302 and 304. These different types of messages include e-mail messages, Peer-to-Peer messages, SMS messages, MMS messages, instant messages, as well as possibly phone call messages and the like. Peer-to-Peer messages include Personal Identification Number (PIN) messages for example. It should be noted that the term messages, as used herein, is also meant to include an indication of an upcoming event such as a one or more tasks that the user must perform or a calendar event that indicates an upcoming event that the user must attend. The phone call messages are messages related to phone calls that the user has received if the mobile device 100 includes telephony functions. The task and calendar events can be provided by a task application and a calendar application, respectively, that can be executed by the mobile device 100 or another device that the mobile device 100 communicates with. The task application and calendar application are synchronized with the message application 136 to provide the task and calendar events by using techniques that are commonly known by those skilled in the art.

The user can designate any one of the above-noted types of messages as important messages that are to be displayed in the first message display region. In at least some cases, as time passes by, the time sensitive messages can be removed from the first message display region. For example, when the date and time for a calendar event has expired, the calendar event can be removed from the first message display region 302 and be displayed in the second message display region 304 or even deleted if configured in this fashion by the user. The user can also manually delete the important messages that the user does not wish to have displayed in the message display region 302 or the user can specify that an important message be displayed in the message display region 304 or stored in a folder.

In some cases, the user can use a menu option (not shown) to specify rules for the fashion in which the important messages are listed in the message display region 302. For example, some of the important messages can be ordered first if they have a higher priority even if they have an older sent date than other important messages listed in the message display region 302. Alternatively, relying on the priority of the important messages to list the important messages in the message display region 302 can be activated only when there are too many important messages to display within the area allocated for the message display region 302 in which case the lower priority important messages are still associated with the message display region 302 but some of them may not be displayed depending on the size of the message display region 302.

Since the user is able to view important messages in the message display region 302 and the remaining messages in the message display region 304 at the same time, and since the messages in both message display regions 302 and 304 can have various formats, as described above, the inbox window 300 can be considered to be a unified inbox. This provides the user with more flexibility since the user does not have to save important messages in another folder or sub-folder and then have to look in this folder for important messages, which can be cumbersome for handheld devices with small screen real-estate. Rather, the user can now simply look at the multiple display regions 302 and 304 of the unified inbox window for important messages as well as any remaining messages in the inbox window.

Figure 6:
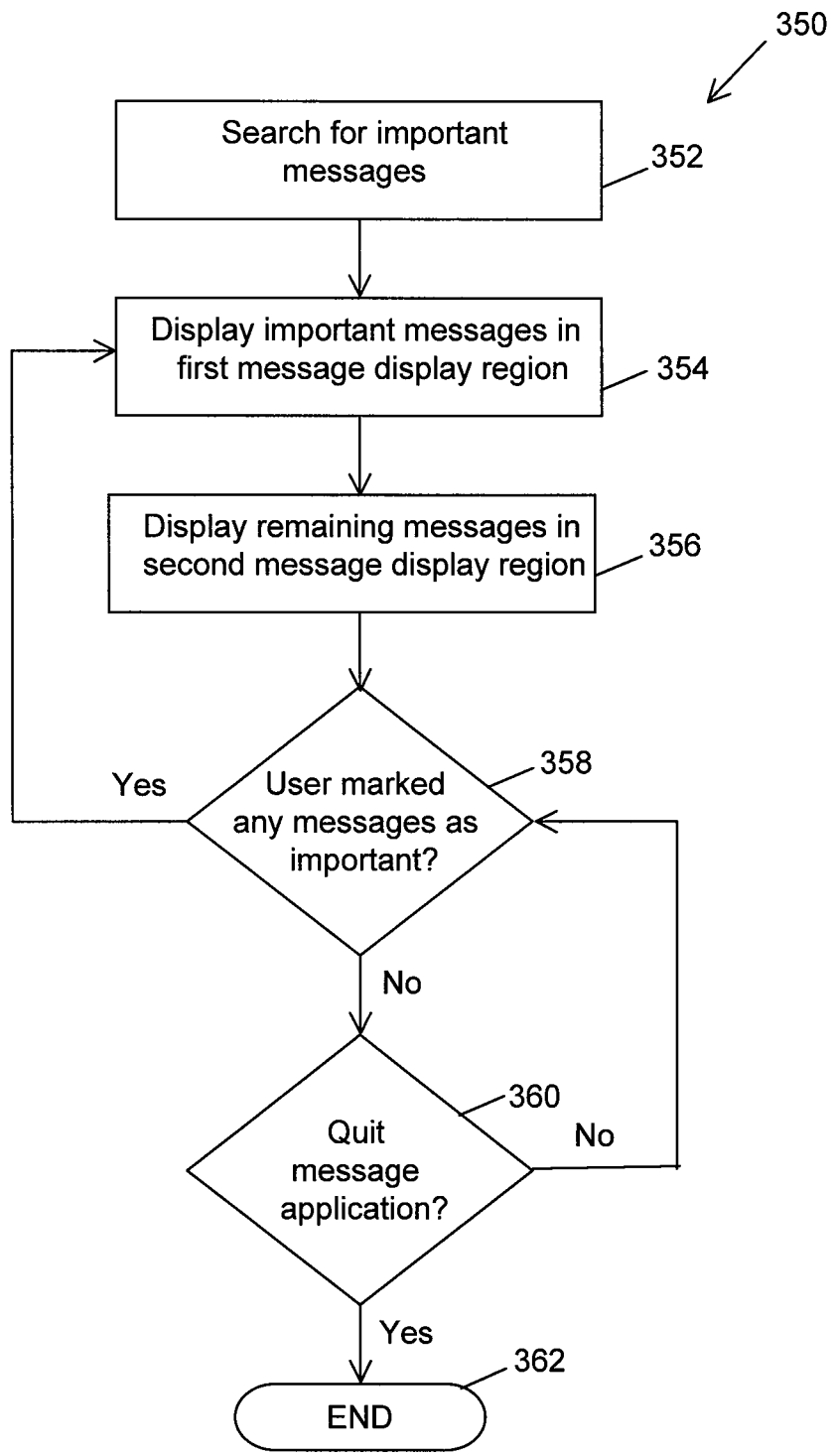
FIG. 6 is a flowchart showing an example embodiment of a method for displaying messages in multiple display regions of an inbox.

Referring now to FIG. 6, shown therein is an example embodiment of a method 350 for displaying messages in multiple display regions of an inbox window. At step 352, the method 350 searches for messages in the inbox window that have been manually designated by the user as being an important message. At step 354, the method 350 displays the located important messages in the first message display region 302. At step 356, the method 350 displays the remaining messages of the inbox in the second message display region 304. At step 358, the method 350 checks to see if the user has just newly designated a message as an important message that is not currently in the first message display region 302. If the result of the decision at step 358 is true, then the method 350 goes to step 354 to display the newly designated important message in the first message display region 302. If the result of the decision at step 358 is false, then the method 350 proceeds to step 360 at which point the method 350 checks if the message application will quit. If this is true, the method 350 proceeds to step 362, otherwise the method 350 goes to step 358 at which point the method 350 will check again for a newly designated important message.

In an alternative example embodiment, the message display region generator 138 can allow the user to automatically designate a message as an important message depending on the value of a certain attribute of the message. For example, the user can configure the message display region generator 138 to automatically designate a message as an important message if it is sent by a certain person or if it is a certain type of message. This can be done in an automatic or dynamic fashion so that an incoming message can be automatically checked and designated as an important message if it meets the designation criteria.

Figure 7:
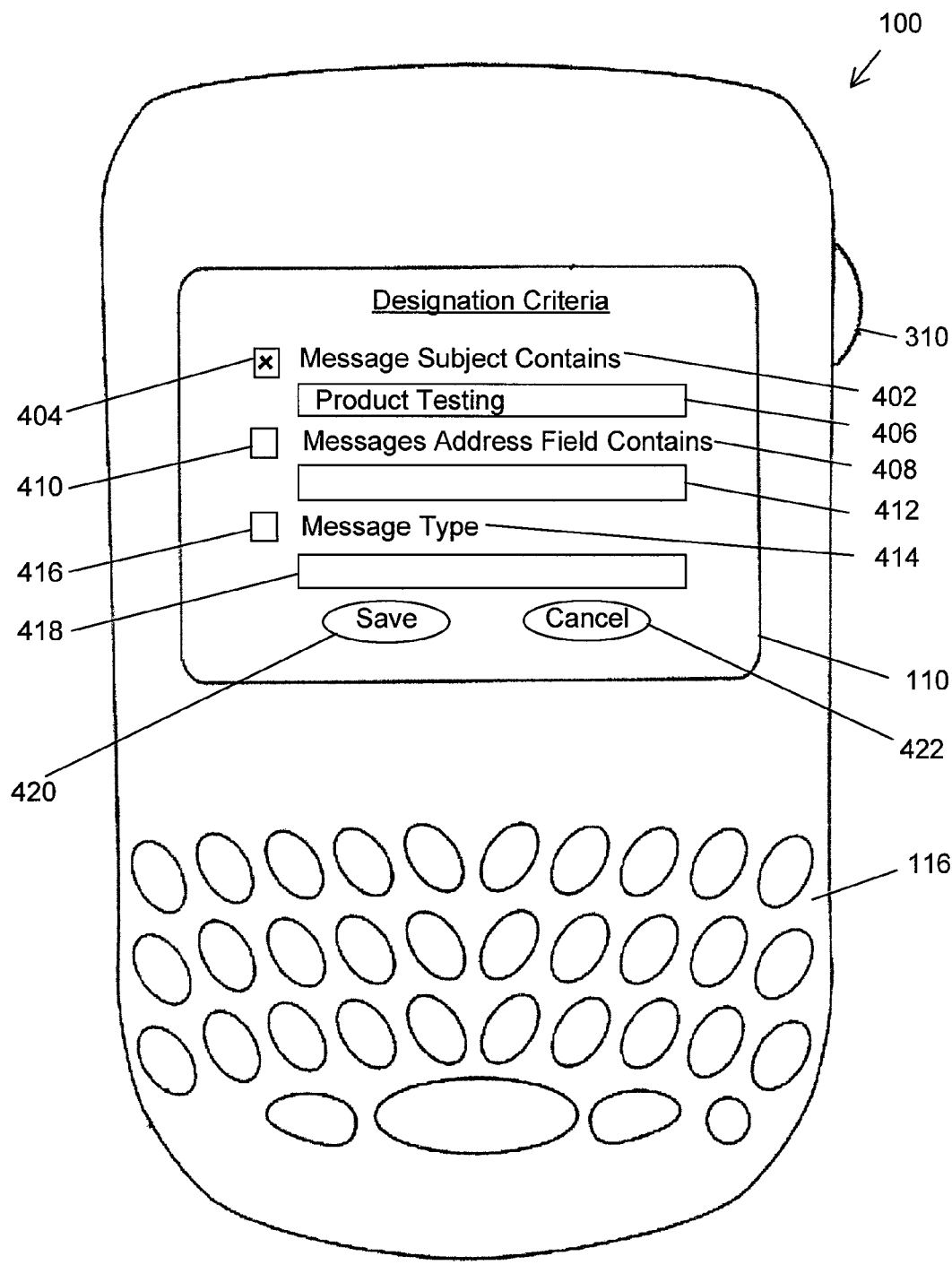
FIG. 7 is an illustration of an example embodiment of a menu for automatically designating important messages for use with an inbox having multiple message display regions in which one of the message display regions shows important messages.

Referring now to FIG. 7, shown therein is an illustration of an example embodiment of a menu 400 that can be used to automatically designate important messages for use with an inbox window having multiple message display regions in which one of the message display regions shows important messages. The menu 400 includes a number of designation criteria 402, 408 and 414 along with corresponding selection boxes 404, 410 and 416, and text entry boxes 406, 412 and 418. The menu 400 also includes save and cancel option buttons 420 and 422.

The designation criteria 402, 408, and 414 include messages with subjects that contain text, including letters, numbers or symbols, as specified in the text entry box 406, messages with address fields that contain certain email addresses or names as specified in the text entry box 412 and messages having certain formats specified by the text entry box 418. Rather than using a text entry box, there can be alternative ways of entering information for each of the designation criteria. For example, for the message type criteria 414, there can be a list of message types each having a corresponding selection box or radio button that the user can select. In other embodiments, other designation criteria can be used. For example, any criteria that can be searched on can be used to flag a message as important (i.e. particular sender(s), particular recipient(s), time of day, message service, priority, text in the body of the message, whether there are attachments or the types of attachments, and the like. Alternatively, other embodiments may not provide all of the designation criteria shown in FIG. 7.

Figure 8:
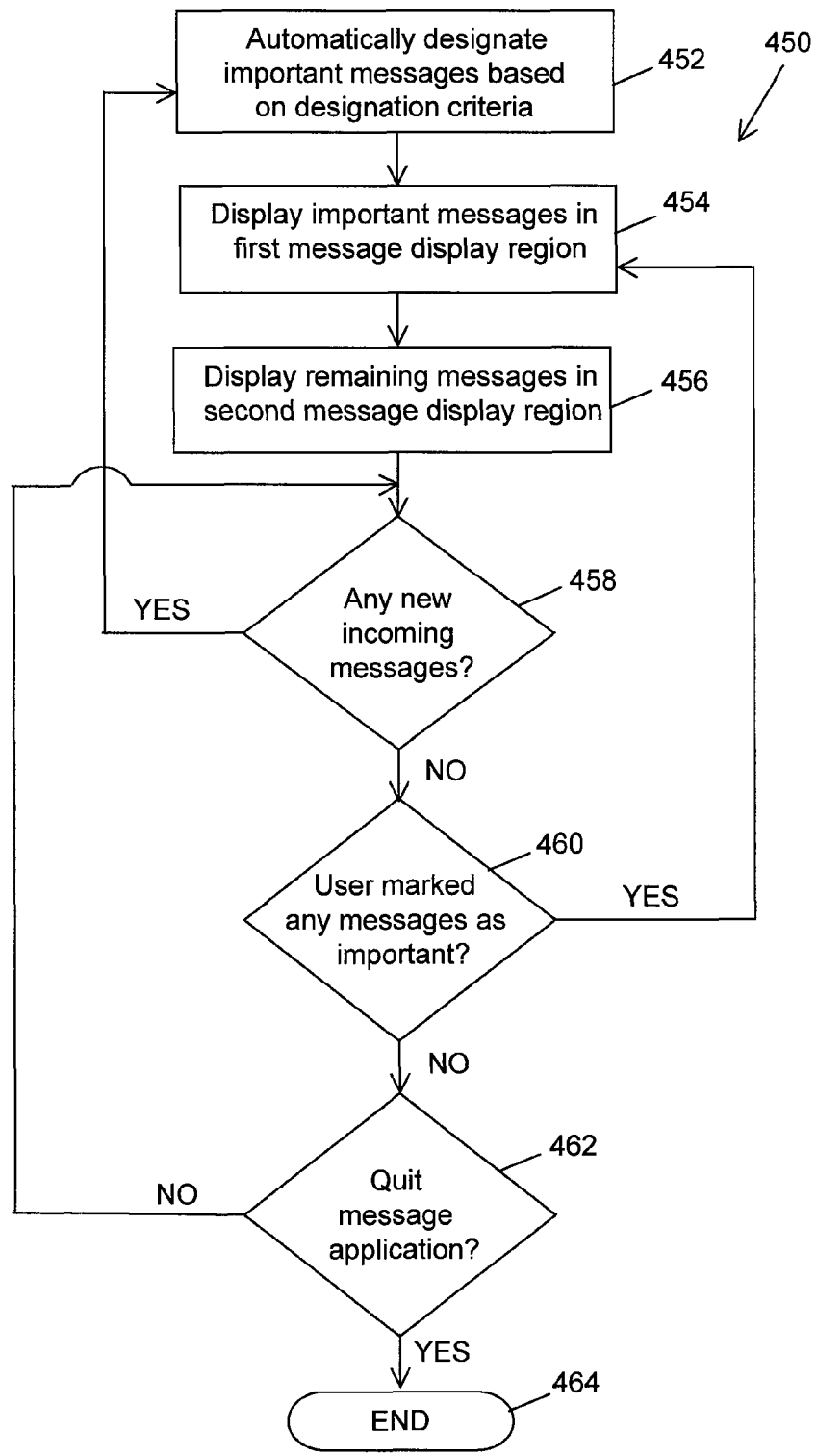
FIG. 8 is a flowchart showing an example alternative embodiment of a method for displaying messages in multiple display regions of an inbox.

Once the designation criteria are set using the options in the menu 400, the message display region generator 138 will scan through the messages in the inbox to automatically designate the important messages and then display the messages in the corresponding message display region. This can be done in a variety of ways. For instance, referring now to FIG. 8, shown therein is an example embodiment of an alternative method 450 for displaying messages in multiple display regions. The method 450 starts at step 452 by searching for messages that satisfy the designation criteria specified by the user and designating the located messages as important messages. At step 454, the method 450 displays the located important messages in the first message display region 302. At step 456, the method 450 displays the remaining messages of the inbox in the second message display region 304. At step 458, the method 450 checks to see if there is a newly arrived message. If the result of the decision at step 458 is true, then the method 450 goes to step 452 to determine if the newly received message should be designated as an important message and carries out steps 454 and 456. If the result of the decision at step 458 is false, then the method 450 proceeds to step 460 at which point the method 450 determines whether any messages have just been newly manually designated by the user to be an important message. If the result of the decision at step 460 is true, then the method 450 goes to step 454 to display the newly designated important message in the first message display region 302 and the remaining messages in the second message display region at step 456. If the result of the decision at step 460 is false, then the method 450 proceeds to step 462 to check if the message application will quit. If this is true, the method 450 proceeds to step 464, otherwise the method 450 goes to steps 458 and 460 to keep monitoring for newly received messages to automatically designate as an important message according to the designation criteria and to check for newly manually designated important messages.

Figure 9:
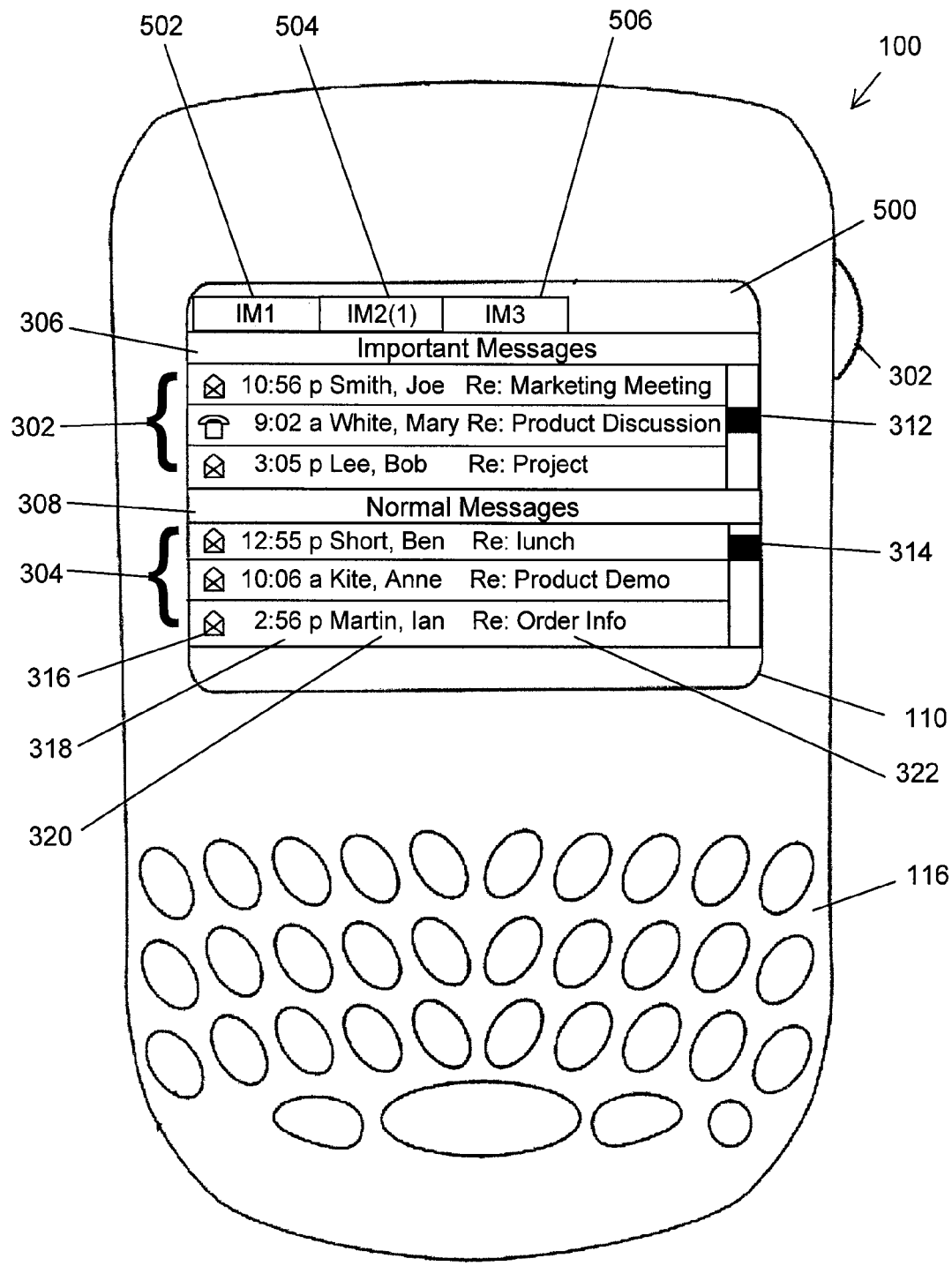
FIG. 9 is an illustration of an example embodiment of an inbox for a mobile device having multiple message display regions, the majority of which are associated with a set of designation criteria.

In an alternative embodiment, there can be multiple additional message display regions associated with other sets of designation criteria. For instance, the designation criteria specified in FIG. 7 can be considered to be a single set of designation criteria. FIG. 9 shows an example embodiment of an inbox window 500 having multiple message display regions, the majority of which are associated with different sets of designation criteria; one of these message display regions is shown as message display region 302 and the others are not shown to save screen real-estate. In this fashion, the view of the displayed message display regions are not restricted by showing more than two message display regions at the same time which is beneficial for smaller devices such as handheld electronic devices. However, depending on the physical size of the display 110, it can be possible to show more than two message display regions at the same time. The inbox window 500 also shows the remaining messages in the message display region 304 that does not satisfy any of the sets of designation criteria. In this example, the visible portions of display regions 302 and 304 correspond to those shown for the inbox window 300.

To access a message display region that is associated with a set of designation criteria and is not currently shown, the user can select the corresponding tab. In this example, three tabs 502, 504 and 506 are shown. In other embodiments, the tabs 502, 504 and 506 can be shown in other locations such as along the side of the message display region 302. The message display region 302 is currently shown since the tab 502 is selected. If the user wishes to view a different message display region associated with a different set of designation criteria, then the user can select the corresponding tab. For example, the user can select the tab 504 in which case the message display region 302 is replaced with the message display region that corresponds with the set of designation criteria that is associated with the tab 504. In an alternative embodiment, the tab can be displayed if the corresponding message display region contains messages.

For message display regions that are not shown, the corresponding tab can provide an indication of the number of important messages in that message display region that have not been viewed by the user. In this example, the tab 504 indicates that there is one important message that has not yet been reviewed by the user. In alternative embodiments, instead of showing the number of unviewed important messages on the tab, the total number of important messages can be shown, or the tab can show the number of unread important messages as well as the total number of important messages in the corresponding message display region.

Figure 10:
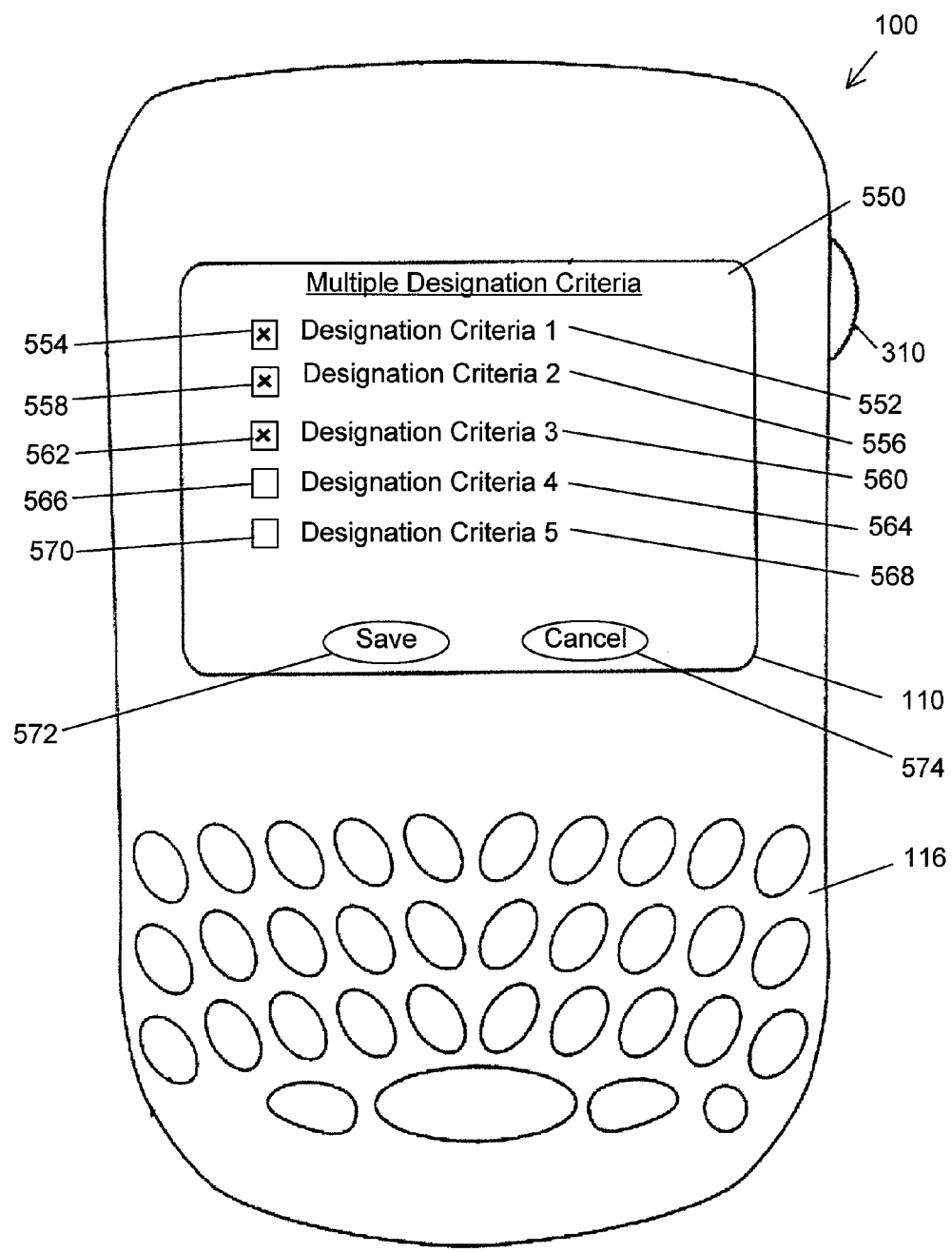
FIG. 10 is an illustration of an example embodiment of a menu for configuring multiple sets of designation criteria associated with multiple display regions.

Referring now to FIG. 10, shown therein is an example embodiment of a menu 550 for configuring multiple sets of designation criteria 552, 556, 560, 564 and 568 associated with multiple message display regions. Once the user has selected one of the selection boxes 554, 558, 562, 566 and 570 that corresponds to one of the sets of designation criteria 552, 556, 560, 564 and 568, the user is shown a menu, such as that shown in FIG. 7, to configure a corresponding set of designation criteria. The user can repeat this operation several times to simultaneously create several different message display regions with messages according to the sets of designation criteria. In this example, the user has configured three sets of designation criteria, which corresponds to the example of FIG. 9.

Figure 11:
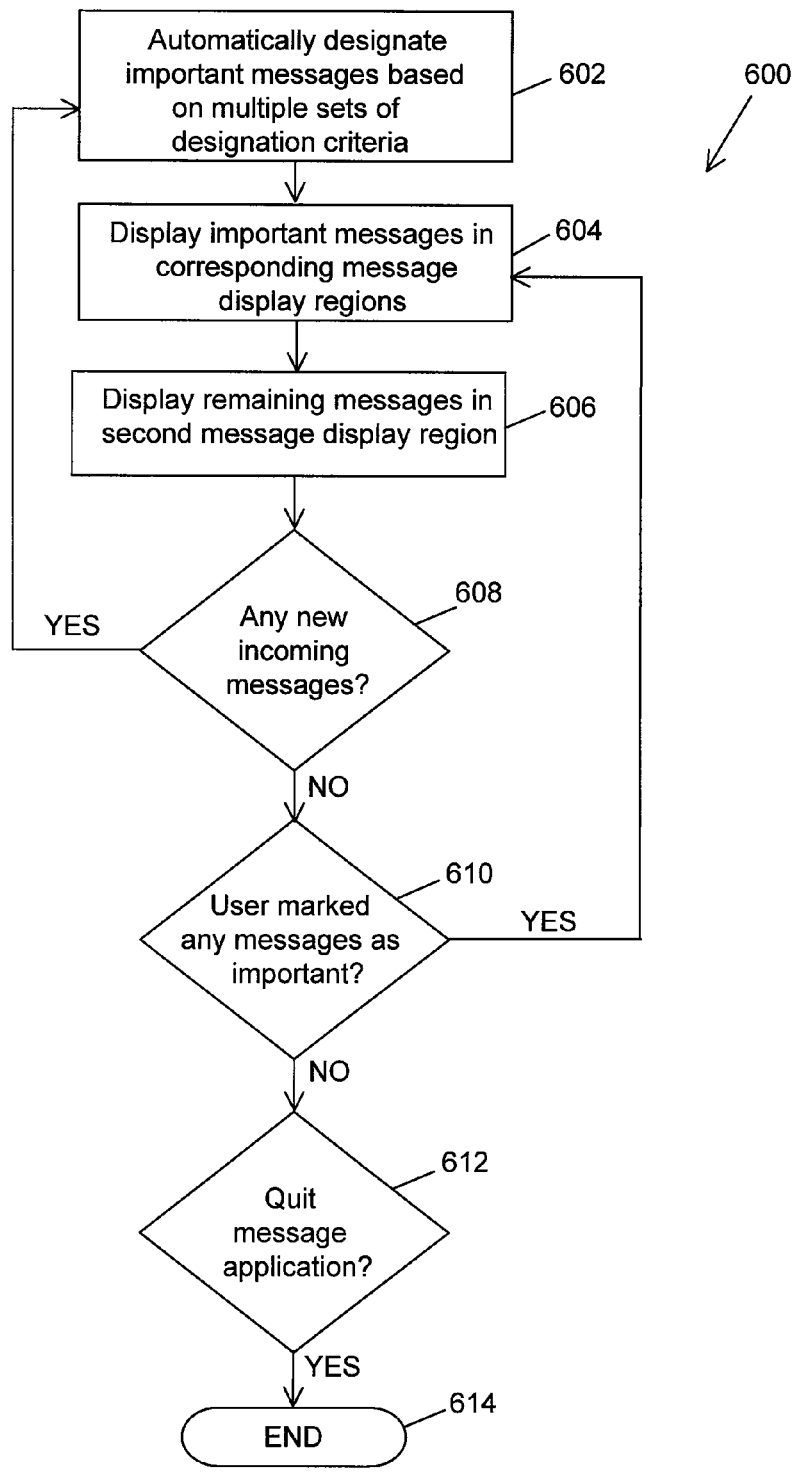
FIG. 11 is a flowchart showing another example alternative embodiment of a method for displaying messages in multiple display regions of an inbox.

Referring now to FIG. 11, shown therein is an example embodiment of another alternative method 600 for displaying messages in multiple display regions corresponding to FIGS. 9 and 10. At step 602, the method 600 searches for messages that satisfy each set of designation criteria that have been specified by the user, designates these messages as important messages and keeps track of which message display region each important message belongs to. Depending on how the user has configured each set of designation criteria, there can be an overlap in the search results. At step 604, the method 600 displays the located important messages for each set of designation criteria in the corresponding message display region. The message display region corresponding to one of the sets of designation criteria, such as the first, can be displayed while the message display regions associated with the other sets of designation criteria can be hidden but with corresponding tabs shown to allow the user to view one of the hidden message display regions. At step 606, the method 600 displays the remaining messages of the inbox in the second message display region 304. At step 608, the method 600 checks to see if there are any newly arrived messages. If the result of the decision at step 608 is true, then the method 600 goes to step 602 to determine if the newly received messages should be designated as important messages based on any of the set of designation criteria and then carries out steps 604 and 606. If the result of the decision at step 608 is false, then the method 600 proceeds to step 610 at which point the method 600 determines whether any messages have been newly manually designated by the user to be an important message. If the result of the decision at step 610 is true, then the method 600 carries out step 604 and places the manually designated important message in the current message display region that is being displayed which shows important messages. If the result of the decision at step 610 is false, then the method 600 proceeds to step 612 to check if the message application will quit. If this is true, the method 600 proceeds to step 614, otherwise the method 600 goes to steps 608 and 610 to keep monitoring for newly received messages to apply the sets of designation criteria and to check for newly manually designated important messages.

The ability to have multiple message display regions which are each associated with a set of designation criteria allows the user to, in effect, search for certain types of messages based on the criteria that is selected for a given set of designation criteria since the message display region generator 138 will locate the messages in the inbox that correspond to the set of designation criteria, mark these messages as important messages and display them in the corresponding message display region. The user can use several sets of designation criteria to run several of these "searches" and show the results in several message display regions. Accordingly, different searches can be performed at the same time and the search results can be shown in different message display regions. When a search is being done, the user is free to view other message display regions in which the search has already been completed or there is no search being performed.

In another alternative, with regards to the multiple message display regions that are associated with different sets of designation criteria, when the user newly manually designates a message as an important message, the user can be prompted to select which of these message display regions should display the newly manually designated important message. In another alternative, the manually designated important message can be placed in the message display window associated with the first set of designation criteria.

In another alternative, the user can configure a set of designation criteria to search one or more different folders of stored messages on the user's mobile device rather than just the inbox. In another alternative, the user can configure a set of designation criteria to search one or more folders of messages that is located remotely from the mobile device such as at the host system 250.

It should also be noted that the time-based approach to important message removal from a message display region that shows important messages does not just apply to messages that have an inherent time sensitivity to them such as task or calendar events. This strategy can be used for any messages. For example, along with setting designation criteria for automatically marking messages as important, an expiry time (not shown) can also be set by the user to a certain period of time, such as four days for example, on an important message identified according to the designation criteria. After the time period associated with the important message has expired, the important message can be automatically moved to the second message display region or alternatively deleted if so desired and specified by the user. This strategy may be more applicable to some sets of designation criteria compared to others.

The display generating embodiments described herein are intended to provide an improved inbox window for display on the mobile device 100 to allow the user to characterize messages for concurrent display with other messages. It will be further understood that the device and method for generating the inbox window can be implemented by a combination of hardware and software. Further, methods and software may be implemented as executable software instructions stored on non-transitory computer-readable media, which are executed by the processor of a computing device. As such, it should be understood that the message window generator 138, or the microprocessor of the device that executes the software instructions, can be considered to be carrying out the steps of the various embodiments of the methods described herein.

In one aspect, according to at least one example embodiment described herein, there is provided a method of displaying an inbox window of a message application. The method comprises:

partitioning a display of the inbox window into a first message display region and a second message display region;

displaying located messages that satisfy user-defined designation criteria in the first message display region; and displaying remaining messages of the inbox window in the second message display region.

The method can further comprise displaying messages manually designated as important messages by the user in the first message display region.

The method can further comprise allowing the user to designate at least one of an e-mail message, a Peer-to-Peer message, a Short Message Service (SMS) message, a phone message, a Multimedia Message Service (MMS) message, an instant messaging message, a task event and a calendar event as the important message.

The method can further comprise displaying the first message display region while allowing the user to scroll through messages in the second message display region.

In at least some cases, the method can further comprise providing at least one additional message display region for displaying messages satisfying at least one additional set of user-defined designation criteria.

In at least some cases, the method can further comprise hiding the at least one additional message display region and allowing the user to select one of the at least one additional message display regions for display.

In at least some cases, the method can further comprise removing a given important message from the first message display region when a time period associated with the given important message has expired.

In this aspect, the method can further comprise allowing the user to set the time period with the given important message during which the given important message will be displayed in the first message display region and after which the given important message will be removed from the first message display region.

In at least some cases, the method can further comprise automatically applying the user-defined designation criteria to incoming messages.

In at least some cases, the method can further comprise allowing the user to configure a set of designation criteria to search one or more folders of messages that is located remotely from a device on which the inbox window is being displayed.

In another aspect, according to at least one example embodiment described herein, there is provided a communications device comprising: a microprocessor configured to control the operation of the communications device; a communication subsystem connected to the microprocessor; a message application executable by the microprocessor, the message application being configured to allow a user to receive messages; and a display. The microprocessor is configured to show an inbox window on the display, the inbox window comprising a first message display region that displays located messages that satisfy user-defined designation criteria, and a second message display region that displays remaining messages of the inbox.

The microprocessor can be further configured to perform any aspects of the method described above.

In yet another aspect, according to at least one example embodiment described herein, there is provided a computer program product comprising a computer readable medium embodying program code means executable by a processor of the communications device for displaying an inbox window of a message application. The method comprises: partitioning a display of the inbox window into a first message display region and a second message display region; displaying located messages that satisfy user-defined designation criteria in the first message display region; and displaying remaining messages of the inbox window in the second message display region.

It should be understood that various modifications can be made to the embodiments described and illustrated herein, without departing from the embodiments, the general scope of which is defined in the appended claims. It should also be understood that while the embodiments were described for a mobile device, the embodiments are generally applicable to any communication or computing device that can receive electronic messages. For instance, the embodiments may be modified for implementation on a computer in which the communication subsystem may instead be a network connection or a modem.

The invention claimed is:

1. A method implemented at a communication device, the method comprising:

associating a first one of a plurality of sets of designation criteria with a first display region and a second one of a plurality of sets of designation criteria with a second display region, each of the plurality of sets of designation criteria being defined with respect to a different message attribute, the first and second display regions being displayable in a single view on a display of the communication device;

identifying messages for display in the first display region by:

identifying any messages satisfying the first one of the plurality of sets of designation criteria; and identifying any messages expressly designated by a user for display in the first display region;

identifying messages for display in the second region by:

identifying any messages satisfying the second one of the plurality of sets of designation criteria; and identifying any messages expressly designated by the user for display in the second display region;

displaying, in the first display region, a listing of the messages identified for display in the first display region;

concurrently displaying, in the second display region, a listing of the messages identified for display in the second display region;

after a new message is received at the communication device, providing a prompt for user designation of either the first display region or the second display region for displaying the new message; and in response to a received user designation of either the first display region or the second display region, associating the new message with the display region thus designated.

2. The method of claim 1, further comprising partitioning the display into at least the first display region and the second display region.

3. The method of claim 1, further comprising updating the single view to include the new message in the display region thus designated.

4. The method of claim 3, wherein updating the single view comprises repeating the identifying the messages for display in the first display region and identifying the messages for display in the second display region.

5. The method of claim 1, further comprising, in response to a selection of another one of the plurality of sets of designation criteria, replacing the displayed first display region with a further display region comprising a listing of messages identified for display in the further display region, while continuing to display the second display region.

6. The method of claim 5, wherein the messages identified for display in the further display region comprise messages selected other one of the plurality of sets of designation criteria and messages expressly designated by the user for display in the further display region.

7. The method of claim 1, wherein the messages satisfying the first one of the plurality of sets of designation criteria overlap the messages satisfying the second one of the plurality of sets of designation criteria.

8. The method of claim 1, wherein the display is partitioned into the first display region, the second display region, and at least one further display region, and the method further comprises concurrently displaying in one of the at least one further display region a listing of messages satisfying a further one of the plurality of sets of designation criteria and messages expressly designated by the user for display in that one of the at least one further display region.

9. The method of claim 1, wherein the display is partitioned into the first display region, the second display region, and a further display region, and the method further comprises concurrently displaying in the further display region a listing of messages not identified for display in either the first or the second display region.

10. The method of claim 1, further comprising automatically applying at least one of the plurality of sets of designation criteria to incoming messages.

11. A communication device, including:
a display;
a communication subsystem; and
a processor in communication with the display and the communication subsystem, the processor being configured to enable:
associating a first one of a plurality of sets of designation criteria with a first display region and a second one of a plurality of sets of designation criteria with a second display region, each of the plurality of sets of designation criteria being defined with respect to a different message attribute, the first and second display regions being displayable in a single view on the display;

identifying messages for display in the first display region by:
identifying any messages satisfying the first one of the plurality of sets of designation criteria; and
identifying any messages expressly designated by a user for display in the first display region;
identifying messages for display in the second region by:
identifying any messages satisfying the second one of the plurality of sets of designation criteria; and
identifying any messages expressly designated by the user for display in the second display region;
displaying, in the first display region, a listing of the messages identified for display in the first display region;
concurrently displaying, in the second display region, a listing of the messages identified for display in the second display region;
after a new message is received at the communication device, providing a prompt for user designation of either the first display region or the second display region for displaying the new message; and
in response to a received user designation of either the first display region or the second display region, associating the new message with the display region thus designated.

12. The communication device of claim 11, wherein the processor is further configured to enable partitioning the display into at least the first display region and the second display region.

13. The communication device of claim 11, wherein the processor is further configured to enable updating the single view to include the new message in the display region thus designated.

14. The communication device of claim 13, wherein updating the single view comprises repeating the identifying the messages for display in the first display region and identifying the messages for display in the second display region.

15. The communication device of claim 11, wherein the processor is further configured to enable, in response to a selection of another one of the plurality of sets of designation criteria, replacing the displayed first display region with a further display region comprising a listing of messages identified for display in the further display region, while continuing to display the second display region.

16. The communication device of claim 15, wherein the messages identified for display in the further display region comprise messages selected other one of the plurality of sets of designation criteria and messages expressly designated by the user for display in the further display region.

17. The communication device of claim 11, wherein the messages satisfying the first one of the plurality of sets of designation criteria overlap the messages satisfying the second one of the plurality of sets of designation criteria.

18. The communication device of claim 11, wherein the display is partitioned into the first display region, the second display region, and at least one further display region, and the method further comprises concurrently displaying in one of the at least one further display region a listing of messages satisfying a further one of the plurality of sets of designation criteria and messages expressly designated by the user for display in that one of the at least one further display region.

19. The communication device of claim 11, wherein the display is partitioned into the first display region, the second display region, and a further display region, and the method further comprises concurrently displaying in the further display region a listing of messages not identified for display in either the first or the second display region.

20. The communication device of claim 11, wherein the processor is further configured to enable automatically applying at least one of the plurality of sets of designation criteria to incoming messages.

21. A non-transitory computer-readable medium bearing code which, when executed by a processor of a communication device, causes the communication device to implement a method of:
- associating a first one of a plurality of sets of designation criteria with a first display region and a second one of a plurality of sets of designation criteria with a second display region, each of the plurality of sets of designation criteria being defined with respect to a different message attribute, the first and second display regions being displayable in a single view on a display of the communication device;
- identifying messages for display in the first display region by:
  - identifying any messages satisfying the first one of the plurality of sets of designation criteria; and
  - identifying any messages expressly designated by a user for display in the first display region;
- identifying messages for display in the second region by:
  - identifying any messages satisfying the second one of the plurality of sets of designation criteria; and
  - identifying any messages expressly designated by the user for display in the second display region;
- displaying, in the first display region, a listing of the messages identified for display in the first display region;
- concurrently displaying, in the second display region, a listing of the messages identified for display in the second display region;
- after a new message is received at the communication device, providing a prompt for user designation of either the first display region or the second display region for displaying the new message; and
- in response to a received user designation of either the first display region or the second display region, associating the new message with the display region thus designated.

\* \* \* \* \*